United States Patent
Misaizu et al.

(10) Patent No.: US 8,902,470 B2
(45) Date of Patent: Dec. 2, 2014

(54) IMAGE PROCESSING APPARATUS, IMAGE FORMING SYSTEM, IMAGE PROCESSING METHOD AND NON-TRANSITORY COMPUTER READABLE MEDIUM

(71) Applicant: Fuji Xerox Co., Ltd., Tokyo (JP)

(72) Inventors: Toru Misaizu, Yokohama (JP); Kenji Hara, Yokohama (JP); Shigeru Arai, Yokohama (JP); Kota Matsuo, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/866,088

(22) Filed: Apr. 19, 2013

(65) Prior Publication Data
US 2014/0092440 A1    Apr. 3, 2014

(30) Foreign Application Priority Data

Oct. 2, 2012 (JP) ................................. 2012-220679

(51) Int. Cl.
| H04N 1/40 | (2006.01) |
| H04N 1/405 | (2006.01) |
| G03F 3/08 | (2006.01) |
| H04N 1/60 | (2006.01) |
| G06K 15/00 | (2006.01) |
| G06K 9/36 | (2006.01) |
| G06K 9/00 | (2006.01) |
| G06K 9/40 | (2006.01) |
| G06K 15/02 | (2006.01) |

(52) U.S. Cl.
CPC .............. G06K 15/1881 (2013.01); H04N 1/40 (2013.01)

USPC ............. 358/3.1; 358/519; 358/1.9; 358/521; 358/3.05; 358/445; 358/3.13; 358/2.1; 382/239; 382/181; 382/268

(58) Field of Classification Search
USPC ......... 358/3.1, 519, 1.9, 521, 3.05, 445, 3.13, 358/2.1; 382/239, 181, 268
See application file for complete search history.

(56) References Cited

U.S. PATENT DOCUMENTS

| 5,121,447 | A * | 6/1992 | Tanioka et al. ............... 382/268 |
| 5,748,774 | A * | 5/1998 | Murata ......................... 382/181 |
| 5,760,918 | A * | 6/1998 | Tanioka et al. ............... 358/445 |
| 8,559,082 | B2 * | 10/2013 | Ogawa ......................... 358/519 |
| 8,675,248 | B2 * | 3/2014 | Matsushita et al. ........... 358/1.9 |

(Continued)

FOREIGN PATENT DOCUMENTS

JP              200527270 A        1/2005

*Primary Examiner* — Charlotte M Baker
*Assistant Examiner* — Rury Grisham
(74) *Attorney, Agent, or Firm* — Sughrue Mion, PLLC

(57) ABSTRACT

An image processing apparatus includes: a multi-level unit that applies a multi-level process on binary halftone dot image data indicating a binary halftone dot image, to form multi-level image data; an acquiring unit that acquires a number of screen lines of the binary halftone dot image data; a tone correcting unit that determines a tone correction amount corresponding to the number of screen lines of the binary halftone dot image data acquired by the acquiring unit, and that applies tone correction on the multi-level image data produced by the multi-level unit, by using the determined tone correction amount; and a re-binarizing unit that binarizes the multi-level image data in which the tone is corrected by the tone correcting unit, without changing a halftone dot shape of the binary halftone dot image data, to produce re-binarized halftone dot image data.

7 Claims, 12 Drawing Sheets

(56) References Cited

U.S. PATENT DOCUMENTS

| | | | |
|---|---|---|---|
| 2003/0030857 A1* | 2/2003 | Ito | 358/521 |
| 2005/0046881 A1* | 3/2005 | Tone et al. | 358/1.9 |
| 2005/0180645 A1* | 8/2005 | Hasegawa et al. | 382/239 |
| 2008/0123146 A1* | 5/2008 | Ike et al. | 358/3.13 |
| 2010/0259791 A1* | 10/2010 | Hayashi et al. | 358/2.1 |
| 2011/0170141 A1* | 7/2011 | Yamaguchi et al. | 358/3.05 |

\* cited by examiner

FIG. 9

DESIGNATE NUMBER OF 1-BIT TIFF SCREEN LINES

○ 100 LINES
○ 150 LINES
○ 175 LINES
○ 200 LINES
● 230 LINES
○ 250 LINES
○ 300 LINES
○ FM SCREEN
○ UNKNOWN 56 (TOUCH PANEL)

IMAGE PROCESSING APPARATUS, IMAGE FORMING SYSTEM, IMAGE PROCESSING METHOD AND NON-TRANSITORY COMPUTER READABLE MEDIUM

CROSS-REFERENCE TO RELATED APPLICATIONS

This application is based on and claims priority under 35 U.S.C. 119 from Japanese Patent Application No. 2012-220679 filed on Oct. 2, 2012.

BACKGROUND

Field

The present invention relates to an image processing apparatus, an image forming system, an image processing method and a non-transitory computer readable medium.

SUMMARY

According to an aspect of the invention, an image processing apparatus includes: a multi-level unit that applies a multi-level process on binary halftone dot image data indicating a binary halftone dot image, to form multi-level image data; an acquiring unit that acquires a number of screen lines of the binary halftone dot image data; a tone correcting unit that determines a tone correction amount corresponding to the number of screen lines of the binary halftone dot image data acquired by the acquiring unit, and that applies tone correction on the multi-level image data produced by the multi-level unit, by using the determined tone correction amount; and a re-binarizing unit that binarizes the multi-level image data in which the tone is corrected by the tone correcting unit, without changing a halftone dot shape of the binary halftone dot image data, to produce re-binarized halftone dot image data.

BRIEF DESCRIPTION OF THE DRAWINGS

Exemplary embodiment(s) of the present invention will be described in detail based on the following figures, wherein FIG. 6A shows environmental tone characteristics in the case of 175 lines which are used as a standard screen line number in the exemplary embodiment, and FIG. 6B shows environmental tone characteristics in the case of 230 lines, FIG. 9 is a diagram showing a specific example in which the number of screen lines is designated by the user, in the case where a UI section in the exemplary embodiment is a touch panel.

DETAILED DESCRIPTION

Hereinafter, an example of an exemplary embodiment of the invention will be described in detail with reference to the drawings. In the exemplary embodiment, it is assumed that "image" includes also characters.

(Printing System)

Figure 1:
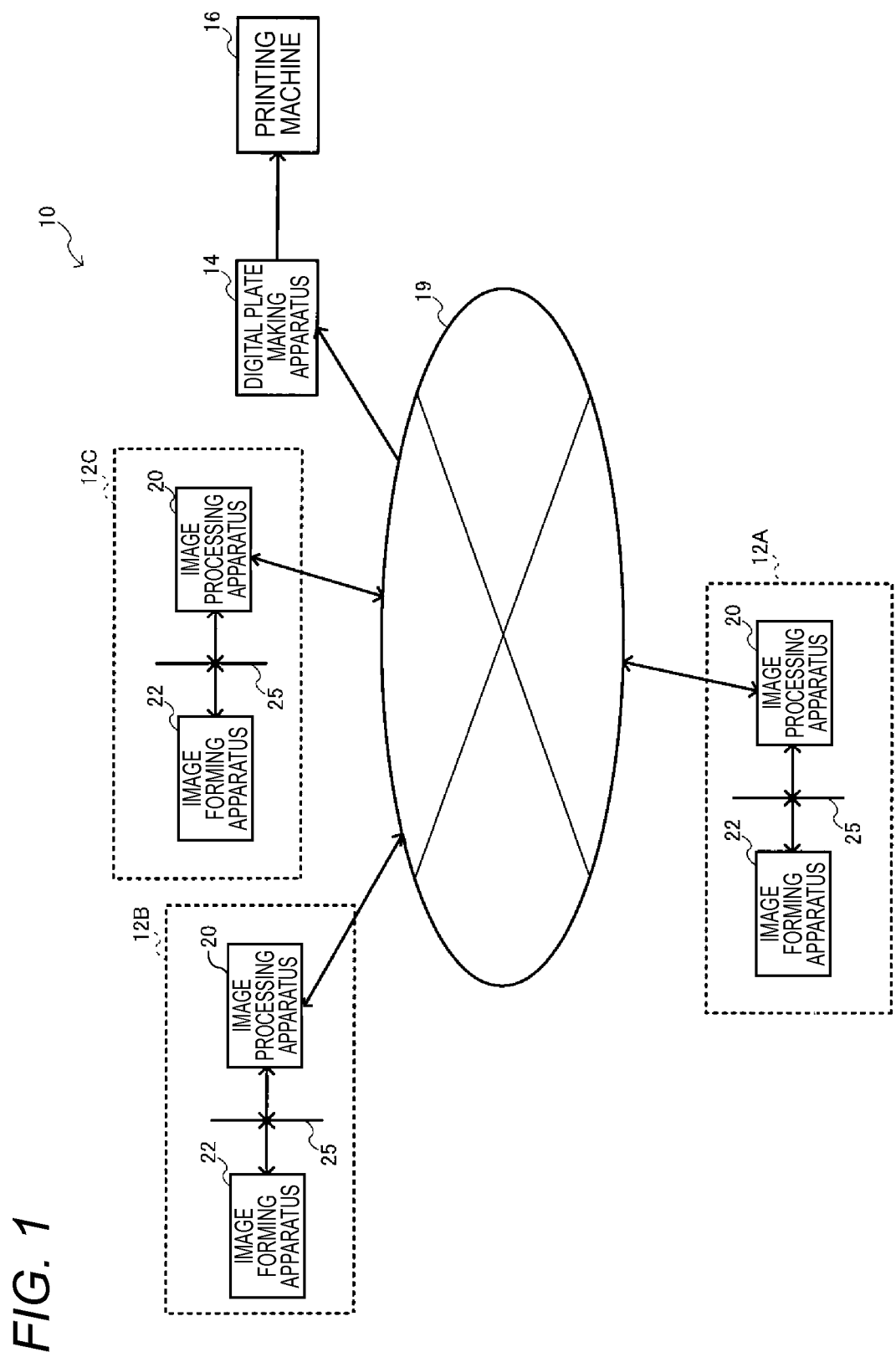
FIG. 1 is a schematic diagram showing an outline of an example of the whole configuration of a printing system in an exemplary embodiment.

FIG. 1 is a schematic diagram showing an outline of an example of the whole configuration of a printing system 10 in the exemplary embodiment. As a specific example, FIG. 1 shows the printing system 10 that uses a digitized print draft, and that performs printing by the CTP (Computer To Plate) in which a plate for printing is produced by a digital plate making apparatus.

The printing system 10 in the exemplary embodiment includes an image forming system 12A, an image forming system 12B, an image forming system 12C, a digital plate making apparatus 14, and a printing machine 16. As shown in FIG. 1, the image forming systems 12A to 12C are configured in a substantially same manner. When the image forming systems are to be generically referred, therefore, they are collectively referred to merely as "image forming system 12."

The image forming system 12 includes an image processing apparatus 20 and an image forming apparatus 22. The image processing apparatus 20 and the image forming apparatus 22 are connected to each other by a bus 25 and the like so as to transmit and receive data to and from each other.

A specific example of the image forming system 12A is a client or the like who requests production of printed matter such as magazines, newspapers, and posters. A specific example of the image forming system 12B is a workshop or the like which, at the request of the client or the like, produces an image of the printed matter. A specific example of the image forming system 12C is a platemaking shop or the like which performs proofreading, platemaking, and the like in accordance with image data produced by the workshop or the like. The image forming systems 12A, 12B, 12C and the digital plate making apparatus 14 are connected to one another by a network 19 so as to transmit and receive data to and from one another. Based on a request from the image forming system 12A (client), the image forming system 12B (workshop) produces an image (image data), and the image forming system 12C (platemaking shop) performs a proof, platemaking, and the like on the produced image. The digital plate making apparatus 14 produces a printing plate based on the platemaking performed by the image forming system 12C. Printing is conducted by the printing machine 16 by using the produced plate.

In the thus configured printing system 10, when a proof of an image is to be performed in a print shop including the digital plate making apparatus 14 and the printing machine 16, usually, the data are output to a color proofing system which is called a DDCP (Direct Digital Color Proof) to perform proof printing. In the exemplary embodiment, in the case where a proof is to be performed in the image forming system 12, by contrast, proof printing is performed by using the image forming apparatus 22.

(Image Forming System)

Figure 2:
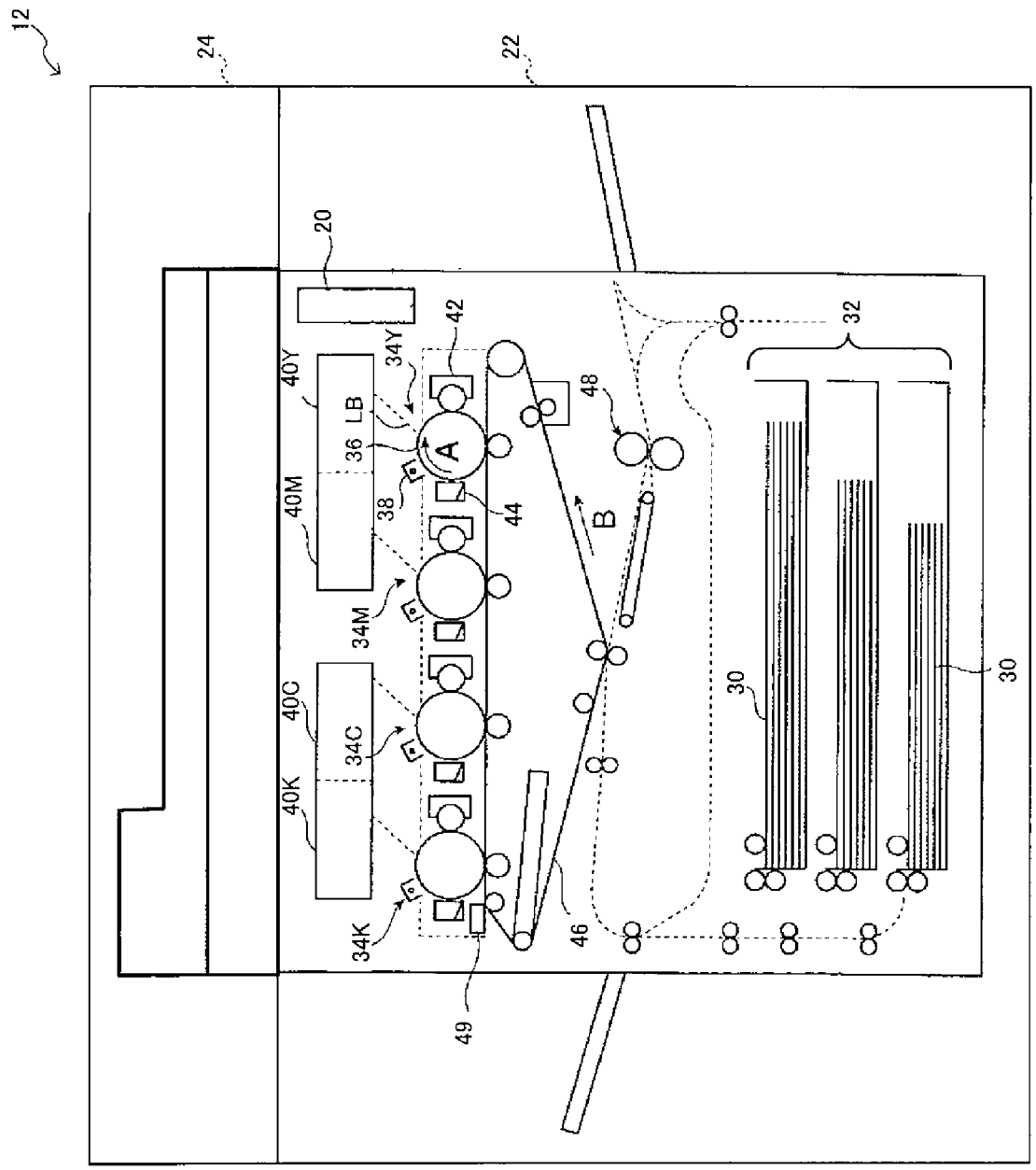
FIG. 2 is a schematic diagram showing an outline of an example of an image forming system of the exemplary embodiment.

Next, the image forming system 12 of the exemplary embodiment will be described in further detail. FIG. 2 is a schematic diagram showing an outline of an example of the image forming system 12 of the exemplary embodiment.

The image forming system 12 of the exemplary embodiment includes the image processing apparatus 20, the image forming apparatus 22, and an image reading apparatus 24 which is not shown in FIG. 1.

The image reading apparatus 24 is a so-called scanner or the like having functions of reading an image formed on a recording medium (a sheet 30 or the like), and forming image data corresponding to the image. The image data produced in the image reading apparatus 24 are supplied to the image processing apparatus 20.

The image forming apparatus 22 has a function of forming an image based on the image data supplied from the image processing apparatus 20, on a sheet 30 (recording medium). The image forming apparatus 22 includes a sheet supplying section 32, image forming units 34, an intermediate transferring member 46, and a fixing device 48.

The image forming units 34 are disposed as image forming sections respectively corresponding to colors of yellow (Y), magenta (M), cyan (C), and black (K). The four image forming units 34Y, 34M, 34C, 34K are basically configured in the same manner except the color of the formed image. Each of the image forming units 34 includes: a photosensitive member 36 which is an image carrier rotated in the direction of the arrow A; a charger 38 for primary charging which uniformly charges the surface of the photosensitive member 36; an exposing device 40 which applies exposure based on image data corresponding to the color to form an electrostatic latent image on the surface of the photosensitive member 36; a developing device 42 which develops the electrostatic latent image formed on the photosensitive drum 36 by a toner of the corresponding color; and a cleaning device 44 which cleans a toner and the like remaining on the surface of the photosensitive member 36.

The image processing apparatus 2 sequentially outputs image data of the corresponding colors to the exposing devices 40Y, 40M, 40C, 40K of the image forming units 34Y, 34M, 34C, 34K of the colors of yellow (Y), magenta (M), cyan (C), and black (K). Laser beams LB which are emitted from the exposing devices 40Y, 40M, 40C, 40K in accordance with the image data scan-expose the surfaces of corresponding photosensitive members 36Y, 36M, 36C, 36K to form electrostatic latent images. The electrostatic latent images formed on the surfaces of the photosensitive members 36Y, 36M, 36C, 36K are developed into toner images of the colors of yellow (Y), magenta (M), cyan (C), and black (K) by the developing devices 42Y, 42M, 42C, 42K, respectively.

The toner images of the colors of yellow (Y), magenta (M), cyan (C), and black (K) are multiply primary transferred onto the intermediate transferring member 46, and then collectively secondary transferred from the intermediate transferring member 46 onto the sheet 30. Furthermore, the sheet 30 is subjected to a fixing process by the fixing device 48, and the sheet on which a full color or monochrome image is formed is discharged to the outside of the image forming apparatus 22.

As the sheet 30, a sheet of the desired size and quality is supplied from the sheet supplying section 32.

The image forming apparatus 22 of the exemplary embodiment further includes a sensor 49. The sensor 49 has a function of reading the densities of the images which are formed on the sheet 30 by the image forming units 34Y, 34M, 34C, 34K. The kind of the sensor 49, the reading method, and the like are not particularly limited as far as the sensor has a function of reading the densities of images.

(Image Processing Apparatus)

Figure 3:
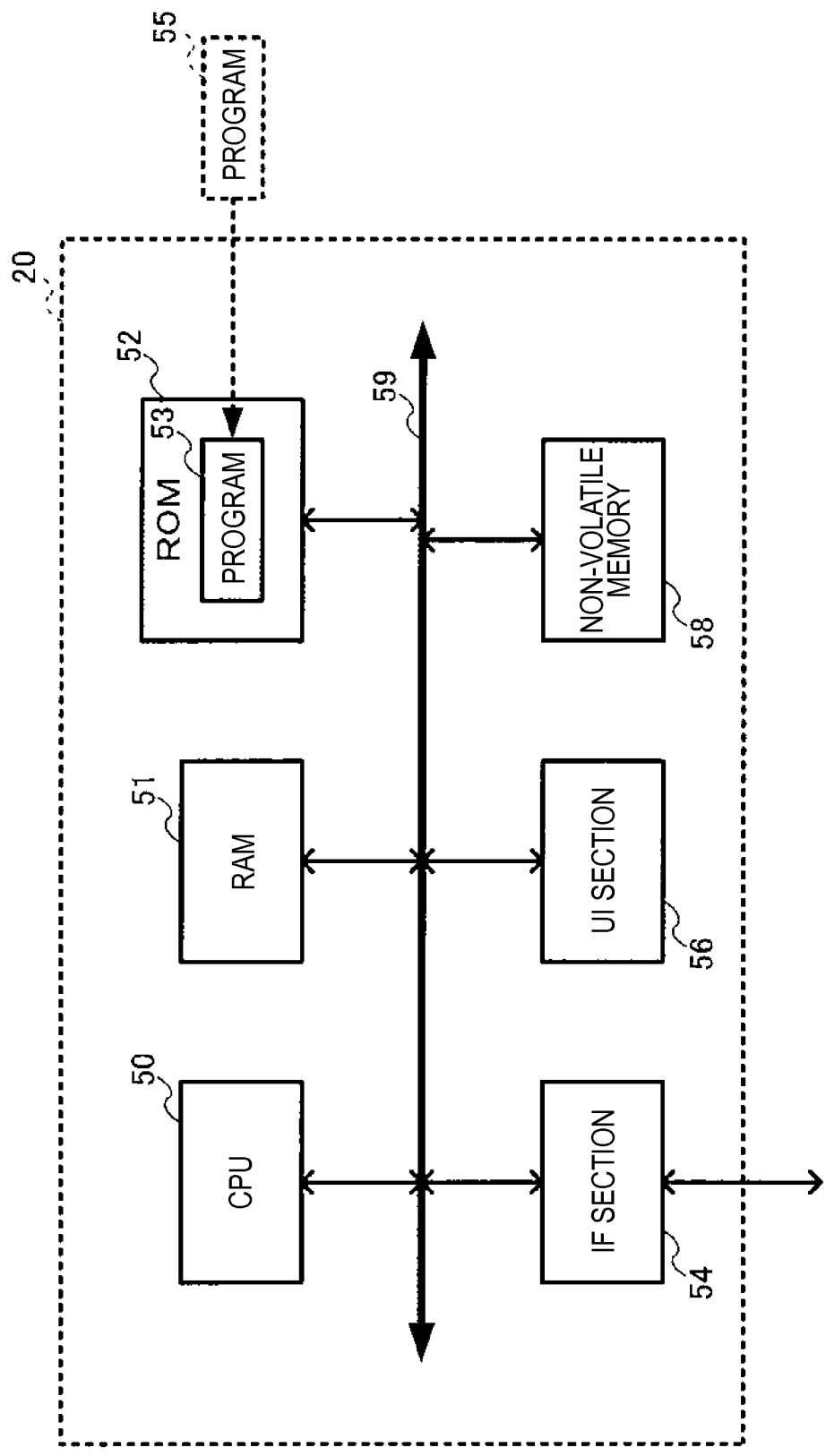
FIG. 3 is a diagram showing a hardware configuration of an example of an image processing apparatus of the exemplary embodiment.

Next, the image processing apparatus 20 of the exemplary embodiment will be described in further detail. FIG. 3 is a diagram showing the hardware configuration of an example of the image processing apparatus 20 of the exemplary embodiment.

The image processing apparatus 20 of the exemplary embodiment includes a CPU 50, a RAM 51, a ROM 52, an IF (InterFace) section 54, a UI (User Interface) section 56, and a non-volatile memory 58. The CPU 50, the RAM 51, the ROM 52, the IF section 54, the UI section 56, and the non-volatile memory 58 are connected to one another by a bus 59 such as a control bus and a data bus so as to transmit and receive data to and from one another.

The CPU 50 has functions of controlling the whole image processing apparatus 20, and performing an image process such as tone correction in accordance with an image processing program 53. The RAM 51 ensures a working area in the case where the CPU 50 executes the program 53. The ROM 52 stores various setting values, program 53, and the like which are used in processing performed by the CPU 50. In the exemplary embodiment, an image process such as a tone correction process which will be described later in detail is performed by executing the program 53 by the CPU 50. The non-volatile memory 58 is a flash memory or the like in which, even when a power supply is interrupted, data are held, and which is backed up by a battery. The non-volatile memory 58 in the exemplary embodiment includes a line number dependency storing section 76, correction limit value storing section 78, control patch data storing section 80, and the like which will be described later in detail.

The IF section 54 has a function of controlling transmission and reception of data among the image processing apparatus 20, the image forming apparatus 22, the image reading apparatus 24, and the like. The UI section 56 has a function of performing a control for receiving instructions which are given by the user to the image forming system 12, and which relate to image formation. The UI section 56 in the exemplary embodiment includes a touch panel (see FIGS. 9 and 10 which will be described later).

Although the exemplary embodiment is configured so that the program 53 is stored in advance in the ROM 52, the invention is not limited to this. The system may be configured so that the program 53 is installed from an external apparatus (not shown) onto the ROM 52. Alternatively, the program may be installed onto the ROM 52 via a network such as the Internet, or from an external storage medium such as a DVD-ROM, a flash memory, or a USB memory onto the ROM 52.

Figure 4:
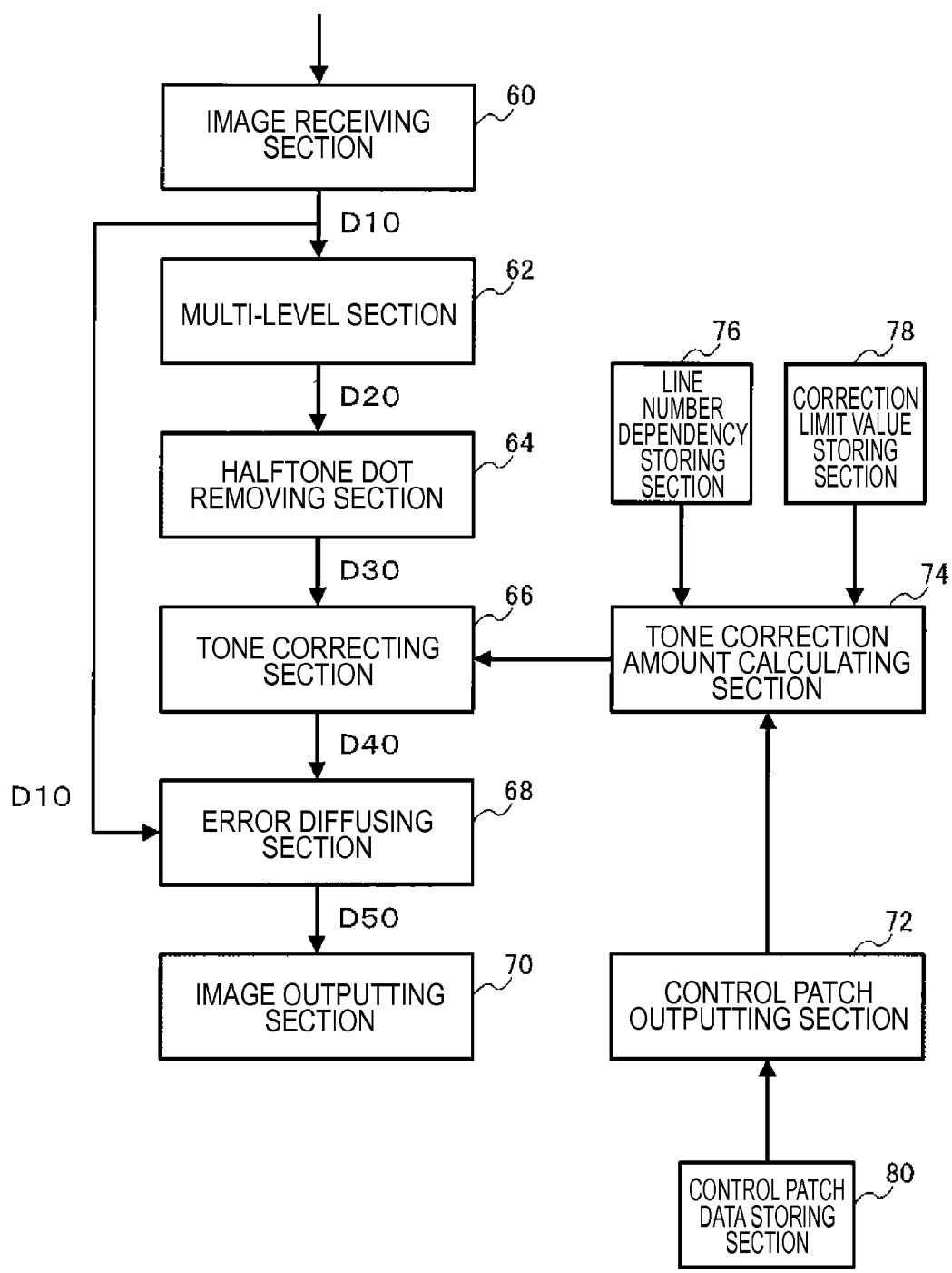
FIG. 4 is a functional block diagram of the example of the image processing apparatus of the exemplary embodiment.

FIG. 4 is a functional block diagram of the image processing apparatus 20 of the exemplary embodiment. As shown in FIG. 4, the image processing apparatus 20 of the exemplary embodiment includes an image receiving section 60, a multi-level section 62, a halftone dot removing section 64, a tone correcting section 66, an error diffusing section 68, an image outputting section 70, a control patch outputting section 72, a tone correction amount calculating section 74, the line number dependency storing section 76, the correction limit value storing section 78, and the control patch data storing section 80.

The image receiving section 60 functions as an interface for receiving image data (1-bit Tiff image data, hereinafter the image data are referred to as the binary halftone dot image data D10) of a draft which are converted to binary halftone dot image data having a halftone dot component by the RIP process, and supplies the received image data to the multi-level section 62 and the error diffusing section 68. In the binary halftone dot image data D10, the value of each pixel is indicated by 1 bit. Namely, the value of a black pixel is "1," and that of a white pixel is "0."

The multi-level section 62 converts the binary halftone dot image data D10 to multi-level image data, and, upon receiving the binary halftone dot image data D10, produces data in which each binary pixel value indicated by binary image data is indicated by a plurality of bits for each pixel. For example, a simple conversion is performed in which, in the case where the pixel value is "0," "0" is set as the new pixel value, and, in the case where the pixel value is "1," "255" is set as the new pixel value. In other words, image data are converted so that the pixel value indicated by 1 bit is indicated by 8 bits (hereinafter, the image data which are produced by the multi-level section 62 are referred to as the simple multi-level image data D20). The multi-level section 62 supplies the simple multi-level image data D20 to the halftone dot removing section 64.

For example, the halftone dot removing section 64 applies a smoothing filtering process on the supplied simple multi-level image data D20, thereby producing image data from which the halftone dot component of the simple multi-level image data D20 is removed away, and which has an intermediate tone (hereinafter, the image data are referred to as the smoothed image data D30). The halftone dot removing section 64 supplies the smoothed image data D30 to the tone correcting section 66. In the smoothed image data D30 in the exemplary embodiment, for example, the pixel value of each pixel is indicated by 8 bits.

The tone correcting section 66 applies tone correction on the smoothed image data D30 supplied from the halftone dot removing section 64, based on the preset tone correction amount. The tone correcting section 66 has a storage section which is not shown, and which is configured by a memory or the like. The tone correction amount is set in the storage section by the tone correction amount calculating section 74. The tone correcting section 66 applies tone correction on the smoothed image data D30 so that the printed matter which is to be printed by the image processing apparatus 20 is identical in tone with that which is printed by the printing machine 16. For example, the planar tone is changed by adding or subtracting images in the periphery of a dot, thereby performing tone correction. The tone correcting section 66 supplies multi-level image data which have undergone the tone correction (hereinafter, the image data are referred to as the tone-corrected image data D40), to the error diffusing section 68. In the tone-corrected image data D40 in the exemplary embodiment, for example, the pixel value of each pixel is indicated by 8 bits.

By using the binary halftone dot image data D10, the error diffusing section 68 applies an error diffusing process on the tone-corrected image data D40 supplied from the tone correcting section 66, by the average error minimization method, and produces binary image data in which each pixel is indicated by 1-bit digital data (hereinafter, the image data are referred to as the output binary image data D50). The method of producing the output binary image data D50 is not particularly limited. For example, the method which is described in JP-A-2005-27270 above may be used. The error diffusing section 68 supplies the produced output binary image data D50 to the image outputting section 70.

The image outputting section 70 has a function of supplying the output binary image data D50 which are supplied from the error diffusing section 68, to the image forming apparatus 22, to allow an image to be formed based on the output binary image data D50.

The control patch outputting section 72 has a function of causing the image forming apparatus 22 to form an image (control patch) based on control patch data which are stored in advance in the control patch data storing section 80. The formed control patch image is read by the sensor 49, and the read data (density data of the image) are supplied to the tone correction amount calculating section 74.

The tone correction amount calculating section 74 calculates the tone correction amount based on the supplied read data and the number of screen lines of the binary halftone dot image data D10. In this case, the tone correction amount calculating section 74 further calculates the tone correction amount in accordance with a line number dependency (correction curve in number of screen lines) which is stored in advance in the line number dependency storing section 76, and a correction limit value (tone correction curve limiter) which is stored in advance in the correction limit value storing section 78. The tone correction amount calculating section 74 sets the calculated tone correction amount in the tone correcting section 66.

Next, the image process in the image processing apparatus 20 of the exemplary embodiment will be described with emphasis on a tone correction amount calculating process.

In the exemplary embodiment, first, the line number dependency is stored in advance in the line number dependency storing section 76. The term "line number dependency" in the exemplary embodiment will be described.

Figure 5:
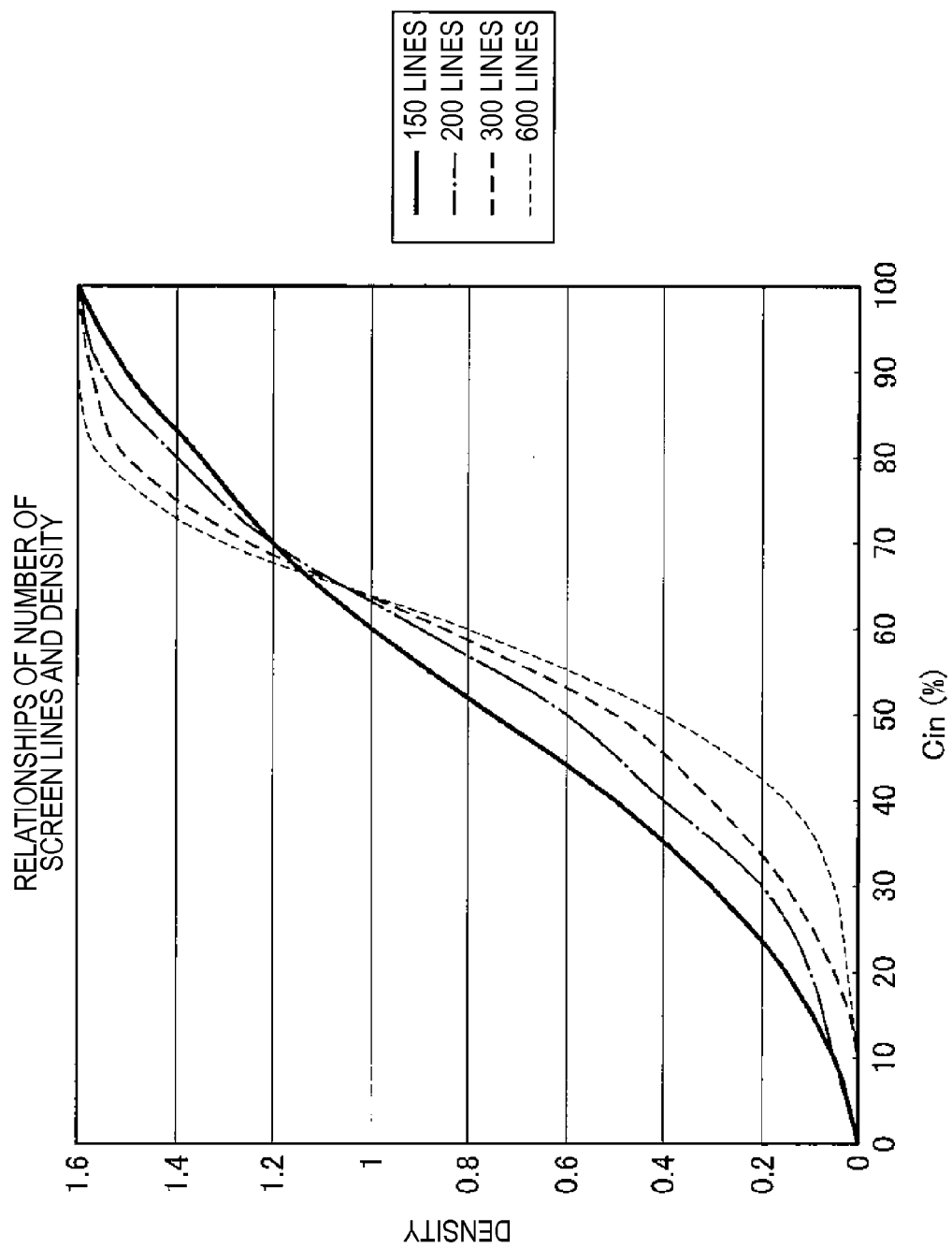
FIG. 5 is a graph exemplarily showing relationships of the number of screen lines and the density.

Since the tone characteristics and the γ value are different, the robustness is different depending on the number of screen lines of an image. FIG. 5 is a graph exemplarily showing relationships of the number of screen lines and the density. The abscissa of FIG. 5 indicates the halftone dot area rate (Cin), and the ordinate indicates the density. As shown in FIG. 5, even when Cin is identical, the density is different depending on the number of screen lines.

Figure 6A:
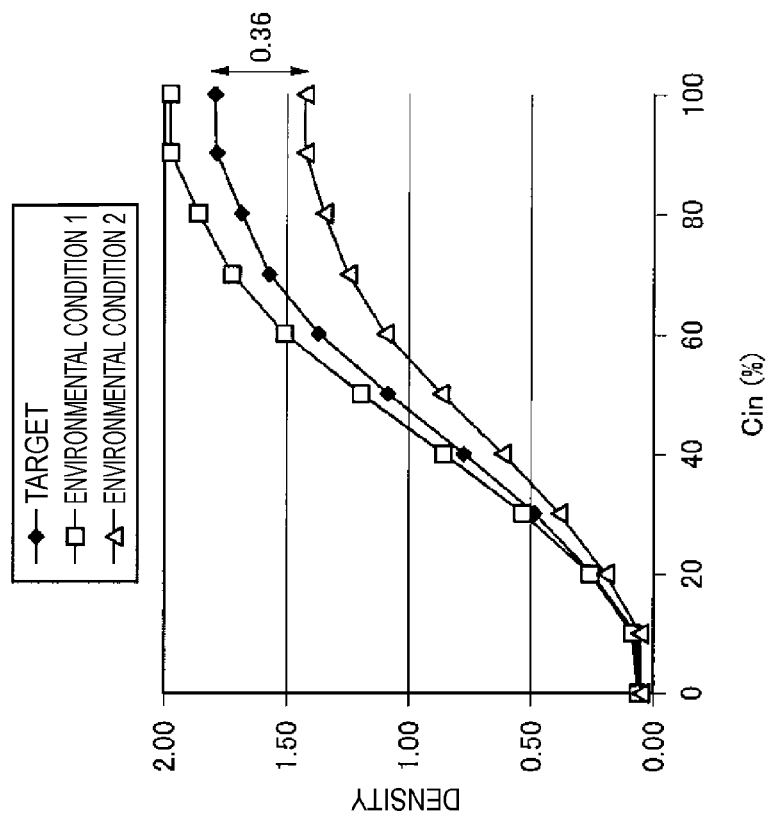
FIGS. 6A and 6B are graphs showing tone characteristics with respect to environmental changes.
Figure 6B:
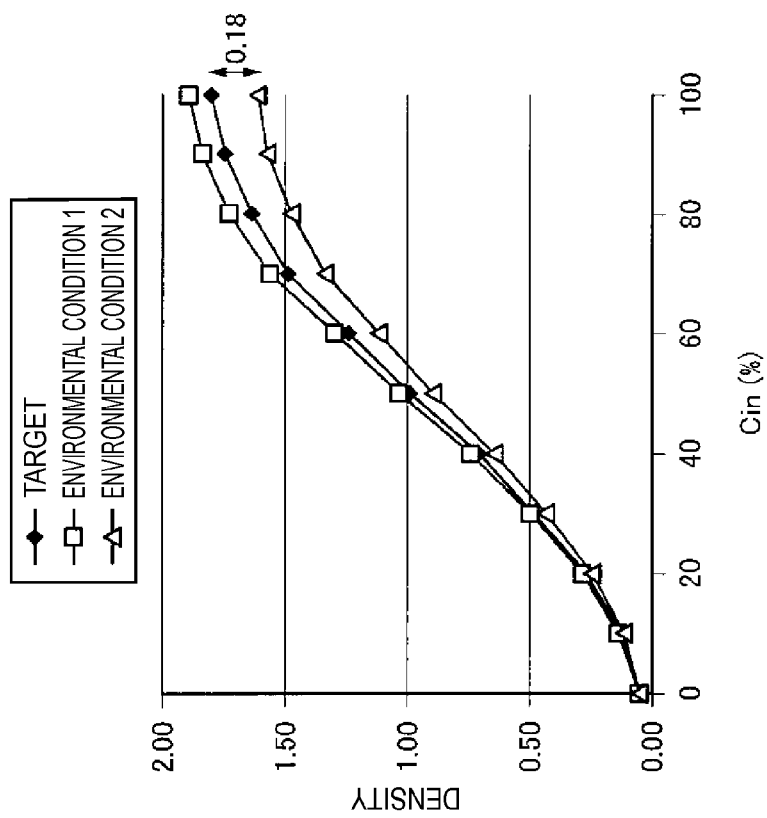

Moreover, also the sensitivity to environmental change is different depending on the number of screen lines. FIGS. 6A and 6B are graphs showing tone characteristics with respect to environmental changes (hereinafter, such characteristics are referred to as environmental tone characteristics). FIG. 6A shows environmental tone characteristics in the case of 175 lines which are used as a standard screen line number in the exemplary embodiment, and FIG. 6B shows environmental tone characteristics in the case of 230 lines. In Environmental conditions 1 and 2 shown in FIGS. 6A and 6B, for example, environmental conditions such as the temperature and the humidity are different. As shown in FIGS. 6A and 6B, in the case of Cin=100%, 230 lines have a sensitivity (corresponding to the deviation from a target) which is two times that of 175 lines. In the case of 230 lines, therefore, the correction amount of the sensitivity is two times that of 175 lines.

In the exemplary embodiment, the phenomenon in which the density and the sensitivity are different depending on the number of screen lines as described above is referred to as the line number dependency. In the exemplary embodiment, therefore, a table in which a correction amount for each Cin is acquired by considering the screen line number dependency with respect to a standard screen line number is previously obtained in the form of an correction curve in number of screen lines for each screen line number. A correction curve in number of screen lines for, as in the curve shown in FIG. 11 described later, correcting a tone correction curve for 175 lines that are used as a standard screen line number in the image processing apparatus 20, to that for 230 lines is previously obtained. The correction curve in number of screen lines is stored in advance in the line number dependency storing section 76.

Figure 7:
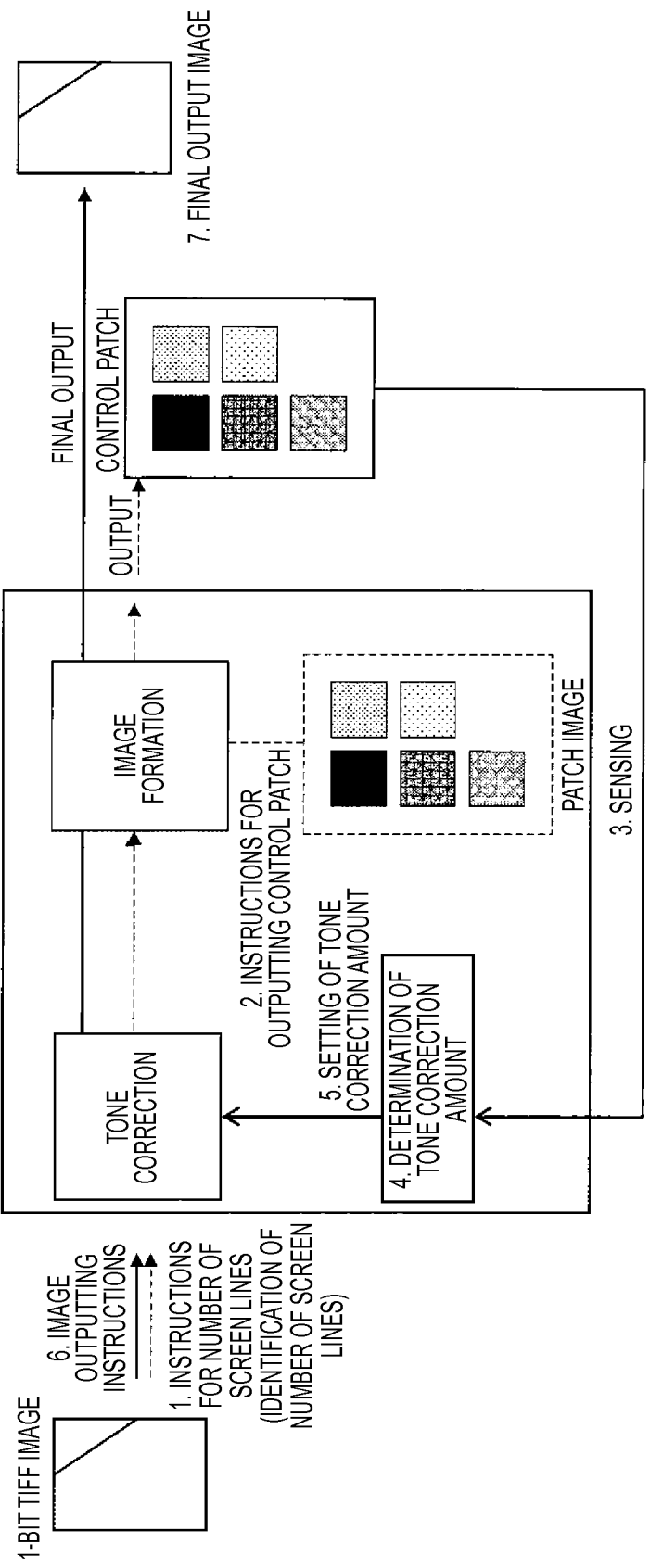
FIG. 7 is an image diagram showing an example of the flow of an image process in the image processing apparatus of the exemplary embodiment.
Figure 8:
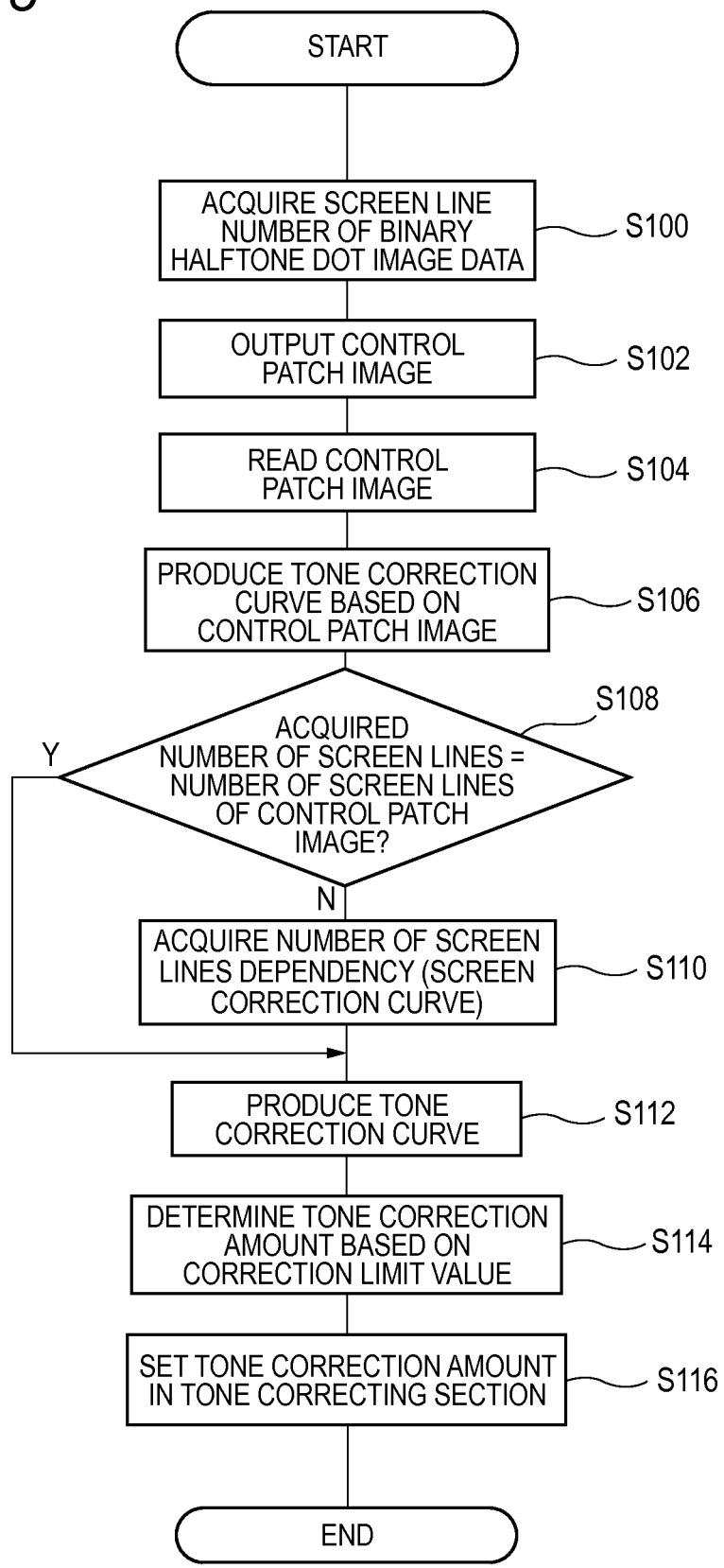
FIG. 8 is a flowchart showing an example of the flow of a tone correction amount calculating process in a tone correction amount calculating section, in the image process in the image processing apparatus of the exemplary embodiment.

FIG. 7 is an image diagram showing an example of the flow of the image process in the image processing apparatus 20 of the exemplary embodiment. FIG. 8 is a flowchart showing an example of the flow of the tone correction amount calculating process in the tone correction amount calculating section 74, in the image process in the image processing apparatus 20 of the exemplary embodiment.

When the binary halftone dot image data D10 are to be printed, the tone correction amount calculating process is performed by the tone correction amount calculating section 74 in the image processing apparatus 20 of the exemplary embodiment. In the flowchart shown in FIG. 8, therefore, step S100 is executed to acquire the number of screen lines of the binary halftone dot image to be printed. In the exemplary embodiment, as a specific example, the UI section 56 acquires the number of screen lines of the binary halftone dot image which is designated by the user (see "1. INSTRUCTIONS FOR NUMBER OF SCREEN LINES (IDENTIFICATION OF NUMBER OF SCREEN LINES)" in FIG. 7). FIG. 9 shows a specific example in which, in the case where the UI section 56 is a touch panel, the user designates the number of screen lines. In FIG. 9, the case where the user designates 230 lines from a plurality of screen line numbers displayed on the UI section (touch panel) 56 is shown. The tone correction amount calculating section 74 acquires the number of screen lines which is designated by the user through the UI section 56 as described above. Hereinafter, the case where the user designates 230 lines will be described as a specific example.

Figure 10:
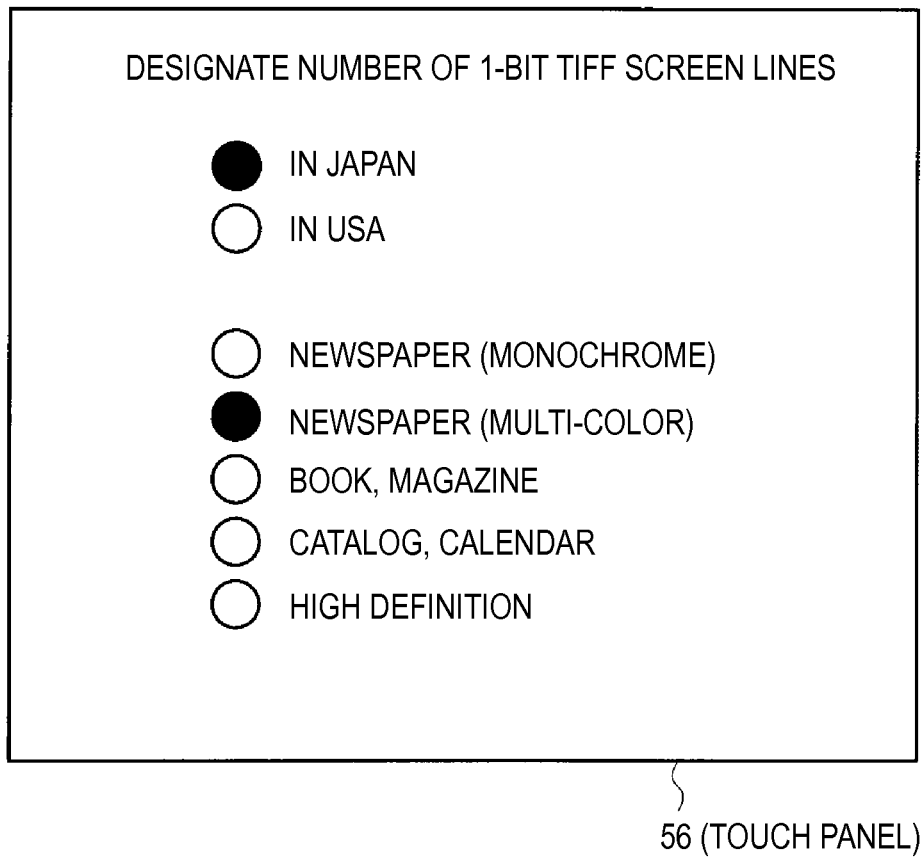
FIG. 10 is a diagram showing a specific example in which one of uses displayed on the UI section (touch panel) is designated by the user, in the case where the UI section in the exemplary embodiment is a touch panel.

In place of the direct designation of the number of screen lines by the user, the use of the image to be printed may be designated. Here, "use" means the country where the printed matter is to be distributed, the kind of the printed matter, etc. According to the use, a number of screen lines which is usually often used is known. As the number of screen lines, for example, 175 lines are often used in Japan, and about 150 lines are often used in USA. In Japan, moreover, as the number of screen lines, 110 lines are often used in a newspaper (multi-color), and about 85 lines are often used in a newspaper (monochrome). Therefore, a configuration may be employed where relationships of uses and number of screen lines are defined in advance and stored, uses are displayed on the UI section (touch panel) 56, and the user can designate one of the uses. FIG. 10 shows a specific example in which one of uses displayed on the UI section (touch panel) 56 is designated by the user. FIG. 10 shows the case where the user designates "In Japan" and "Newspaper (multi-color)." In this way, the tone correction amount calculating section 74 acquires the number of screen lines according to the use which is designated by the user through the UI section 56.

In next step S102, the control patch outputting section 72 causes the image forming apparatus 22 to output the control patch (see "2. INSTRUCTIONS FOR OUTPUTTING CONTROL PATCH" in FIG. 7). In the exemplary embodiment, data of the control patch of the standard screen line number (175 lines) are stored in advance in the control patch data storing section 80.

In next step S104, the control patch image formed by the image forming apparatus 22 is read, and the density data are acquired. In the exemplary embodiment, the density data are sensed by using the sensor 49 in the image forming apparatus 22 (see "3. SENSING" in FIG. 7). The means for acquiring the density data of the control patch image is not limited to the sensing using the sensor 49, and may be realized by using measured color data which are read by using the image reading apparatus 24. In either case, it is requested to acquire the density data of the control patch image.

In next step S106, the tone correction amount calculating section 74 produces the tone correction curve based on the acquired density data of the control patch image. As the technique for producing the tone correction curve based on the acquired density data, any usual technique may be employed. In the exemplary embodiment, the technique is not particularly limited. As a result of the process, the tone correction curve for the standard screen line number (175 lines) is obtained.

In next step S108, it is determined whether the acquired number of screen lines coincides with the number of screen lines (in this case, 175 lines) of the control patch image or not. In the exemplary embodiment, the acquired number of screen lines is 230 lines, and therefore it is determined that coincidence is not established. The determination may be conducted in the following manner. An allowable range may be set in advance. In addition to the case where complete coincidence is established, also in the case where the difference between the acquired number of screen lines and the number of screen lines of the control patch image is within the allowable range, it may be deemed that coincidence is established. If the line numbers are equal to each other, the determination is affirmative, and the process proceeds to step S112. By contrast, if the line numbers are not equal to each other, the determination is negative, and the process proceeds to step S110.

In step S110, the line number dependency (correction curve in number of screen lines) is acquired from the line number dependency storing section 76. As a specific example, here, the correction curve in number of screen lines from 175 lines to 230 lines is acquired from the line number dependency storing section 76. In this case, when an correction curve in number of screen lines corresponding to the acquired number of screen lines (designated by user) is not stored in the line number dependency storing section 76, the curve which is one of the correction curve in number of screen lines stored in the line number dependency storing section 76, and which corresponds to a number of screen lines that is close to the acquired number of screen lines may be acquired.

In next step S112, a tone correction curve corresponding to the acquired number of screen lines is produced. In the case where a tone correction curve is to be produced, when the acquired number of screen lines coincides with the number of screen lines (175 lines) of the control patch image (the determination in step S108 is affirmative), it is simply performed to produce the tone correction curve for the standard screen line number (175 lines).

Figure 11:
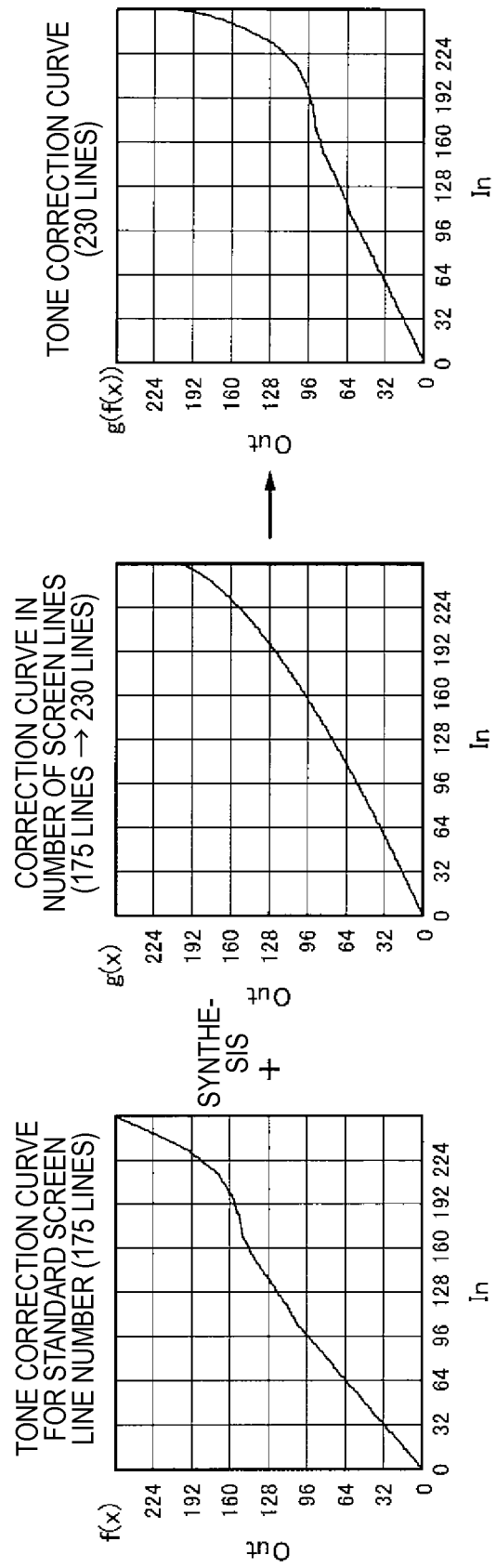
FIG. 11 is a view illustrating production of a tone correction curve according to an acquired number of screen lines, in the tone correction amount calculating section in the exemplary embodiment.

By contrast, in the case where the acquired number of screen lines is different from the number of screen lines (175 lines) of the control patch image (the case where the correction curve in number of screen lines is acquired in step S110), the correction curve in number of screen lines is superimposed on the tone correction curve for the standard screen line number (175 lines) as shown in FIG. 11, thereby producing the tone correction curve corresponding to the acquired number of screen lines.

In next step S114, the tone correction amount is determined based on the correction limit value (see "4. DETERMINATION OF TONE CORRECTION AMOUNT" in FIG. 7). In the tone correction amount calculating section 74, first, the tone correction amount is determined from the produced tone correction curve. The technique for determining the tone correction amount from the tone correction curve is not particularly limited. The tone correction amount is determined by correcting the tone so that the output value coincides with the target value.

Figure 12:
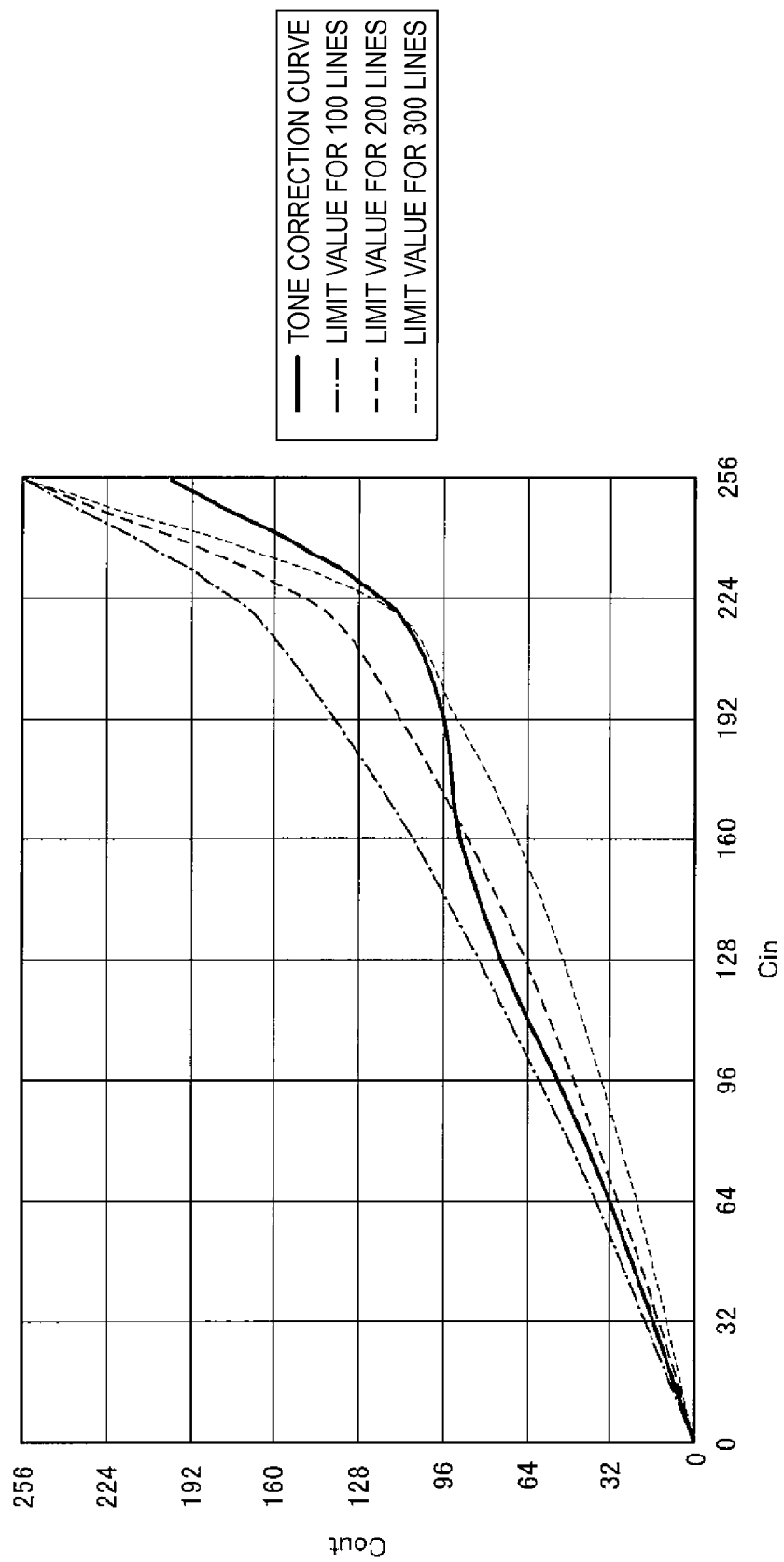
FIG. 12 is a graph showing specific examples of curves of a correction limit value for respective number of screen lines.

In the determination, depending on the tone correction amount determined from the tone correction curve, there is a case where the tone correction cannot be adequately performed or an image quality defect occurs, and therefore the tone correction amount is adjusted by the limit value (the correction limit value, specifically, the curve of the correction limit value in exemplary embodiment). FIG. 12 shows a specific example of the curve of the correction limit value. The curve of the correction limit value is experimentally obtained in advance. While considering the characteristics of the image forming apparatus 22, specifically, the allowable range of an image quality defect is previously experimentally obtained by changing the TRC (Tone Reproduction Curve). The correction limit value which is obtained for each screen line number in this way is stored in advance in the correction limit value storing section 78.

When the number of screen lines is large, the sensitivity to environmental change is high as described above, and the tone correction amount becomes large. Therefore, a wide range of correction is required, and an overflow (image quality defect) due to error diffusion hardly occurs. By contrast, when the number of screen lines is small, the sensitivity to environmental change is low as described above, and the tone correction amount becomes small. However, an overflow (image quality defect) due to error diffusion easily occurs. Therefore, the range of correction must be narrowed.

As described above, the larger the number of screen lines, the wider the range of correction, and hence the correction limit value becomes larger. By contrast, the smaller the number of screen lines, the narrower the range of correction, and hence the correction limit value become smaller.

In the tone correction amount calculating section 74, when the tone correction amount exceeds the correction limit value, the amount is adjusted so as not to exceed the correction limit value, based on the tone correction curve and the curve of the correction limit value. In the exemplary embodiment, when the tone correction amount exceeds the correction limit value, specifically, the correction limit value is determined as a new tone correction amount. In the example shown in FIG. 12, the case of Cin=192 will be considered. When the number of screen lines is 300 lines, the tone correction amount which is determined from the tone correction curve does not exceed the correction limit value. By contrast, when the number of screen lines is 100 lines, the tone correction amount which is determined from the tone correction curve exceeds the correction limit value. When Cin=192 and the number of screen lines is 300 lines, therefore, the tone correction amount which is determined from the tone correction curve is used. By contrast, when Cin=192 and the number of screen lines is 100 lines, the correction limit value is determined as the tone correction amount. As described above, in the case where the tone correction amount exceeds the correction limit value, it is requested that the tone correction amount is adjusted so as not to exceed the correction limit value, but it is not limited to the correction limit value=the tone correction amount.

In next step S116, the determined tone correction amount is set in the storage section (not shown) of the tone correcting section 66 (see "5. SETTING OF TONE CORRECTION AMOUNT" in FIG. 7), and then the tone correction amount calculating process by the tone correction amount calculating section 74 is ended.

When the tone correction amount which is appropriate to the binary halftone dot image data D10 that will be subjected to the image formation is set in the tone correcting section 66 as described above, the image outputting instructions by the user are received through the UI section 56 (see "6. IMAGE OUTPUTTING INSTRUCTIONS" in FIG. 7).

When the image outputting instructions are received, as shown in FIG. 4 described above, the image receiving section 60 receives the binary halftone dot image data D10, and supplies the data to the multi-level section 62 and the error diffusing section 68. The multi-level section 62 supplies the simple multi-level image data D20 in which the binary halftone dot image data D10 are multi-level, to the halftone dot removing section 64. The halftone dot removing section 64 supplies the smoothed image data D30 in which the simple multi-level image data D20 are smoothed and halftone dots are removed away, to the tone correcting section 66. The tone correcting section 66 supplies the tone-corrected image data D40 in which the smoothed image data D30 are tone-corrected based on the tone correction amount set by the tone correction amount calculating section 74, to the error diffusing section 68. The error diffusing section 68 applies the error diffusing process on the tone-corrected image data D40 by using the binary halftone dot image data D10, and supplies the output binary image data D50 which are produced without changing the halftone dot shape of the binary halftone dot image data D10, to the image outputting section 70. The image outputting section 70 instructs the image forming apparatus 22 to form an image which is based on the output binary image data D50. The image forming apparatus 22 outputs a final output image which is formed based on the output binary image data D50 (see "7. FINAL OUTPUT IMAGE" in FIG. 7).

In the case where a large number of final output images are output, environmental changes such as the internal temperature of the image forming apparatus 22 may occur during the output, and therefore it is preferable to adequately perform the setting of the tone correction amount at a predetermined timing.

As described above, in the image processing apparatus 20 of the image forming system 12 of the exemplary embodiment, when the binary halftone dot image data D10 are to be printed, the control patch image is output, the tone correction curve is produced based on the density data of the control patch image, and the tone correction amount is calculated. In the case where the number of screen lines of the binary halftone dot image data D10 coincides with that of the control patch image, a value calculated from the control patch image is set as the tone correction amount. By contrast, in the case where the number of screen lines of the binary halftone dot image data D10 is different from that of the control patch image, the correction curve in number of screen lines which is based on the number of screen lines of the binary halftone dot image data D10 and the number of screen lines of the control patch image is acquired from the line number dependency storing section 76. The correction curve in number of screen lines is superimposed on the tone correction curve of the control patch image to produce the tone correction curve for the binary halftone dot image data D10. A value calculated from the produced tone correction curve is set as the tone correction amount.

In the exemplary embodiment, therefore, the accuracy of tone correction can be improved without changing the halftone dot structure of the binary halftone dot image data D10.

Particularly, the accuracy of tone correction in which tone deviation caused by a temporal change is corrected is improved.

In the exemplary embodiment, moreover, the tone correction amount is adjusted so as not to exceed the correction limit value by the correction limit value corresponding to the number of screen lines stored in the correction limit value storing section 78. According to the configuration, the generation of an image quality defect is suppressed.

In the exemplary embodiment, the case where the tone correction amount is calculated by using the control patch of the standard screen line number has been described. However, the number of screen lines of the control patch is not limited to this. For example, control patch data of a plurality of control patches of different screen line numbers may be stored in the control patch data storing section 80. In this case, a control patch of a number of screen lines which is closest to the acquired number of screen lines may be used.

In the exemplary embodiment, the case where a number which is designated by the user through the UI section 56 is used as the number of screen lines of the binary halftone dot image data D10 has been described. However, the number of screen lines is not limited to this. In the case where the binary halftone dot image data D10 received by the image receiving section 60 contain information related to the number of screen lines, the number of screen lines may be acquired based on the information contained in the binary halftone dot image data D10.

In the exemplary embodiment, the case where the image processing apparatus 20 is disposed inside the image forming apparatus 22 has been described. However, the location of the image processing apparatus is not limited to this. The image processing apparatus may be disposed outside the image forming apparatus 22.

The configurations of the printing system 10, the image forming system 12, the image processing apparatus 20, and the image forming apparatus 22, and the image and tone correction amount calculating processes, and the like of the image processing apparatus 20 which have been described in the exemplary embodiment are mere examples. Of course, they can be changed in accordance with the situation without departing from the spirit of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a multi-level unit configured to apply a multi-level process on binary halftone dot image data indicating a binary halftone dot image, to form multi-level image data;
an acquiring unit configured to acquire a number of screen lines of the binary halftone dot image data;
a tone correcting unit configured to determine a tone correction amount corresponding to the number of screen lines of the binary halftone dot image data acquired by the acquiring unit, and configured to apply tone correction on the multi-level image data produced by the multi-level unit, by using the determined tone correction amount; and
a re-binarizing unit configured to binarize the multi-level image data in which the tone is corrected by the tone correcting unit, without changing a halftone dot shape of the binary halftone dot image data, to produce re-binarized halftone dot image data,
wherein the apparatus further includes a setting unit configured to set the number of screen lines of the binary halftone dot image, and
wherein the acquiring unit is configured to acquire the number of screen lines which is set by the setting unit.

2. The image processing apparatus according to claim 1, wherein, in a case where a number of screen lines of a tone correction image is different from the number of screen lines of the binary halftone dot image, the tone correcting unit acquires an tone reproduction correction coefficient in number of screen lines in accordance with the number of screen lines of the tone correction image and the number of screen lines of the binary halftone dot image, and applies tone correction on the multi-level image data, by using a tone correction amount of the multi-level image data which is determined based on: a tone correction amount determined based on a density of the tone correction image; and the tone reproduction correction coefficient in number of screen lines.

3. The image processing apparatus according to claim 1, wherein, in a case where a difference between the number of screen lines of the tone correction image and the number of screen lines of the binary halftone dot image is within an allowable range set in advance, the tone correcting unit applies tone correction on the multi-level image data, by using a tone correction amount determined based on a density of the tone correction image.

4. The image processing apparatus according to claim 1, wherein the tone correcting unit compares the determined tone correction amount of the multi-level image data with a limit value of the tone correction amount which is determined set in advance in accordance with the number of screen lines, and, if the tone correction amount exceeds the limit value, adjusts the tone correction amount so as not to exceed the limit value.

5. The image processing apparatus according to claim 4, wherein the limit value is reduced in accordance with reduction of the number of screen lines.

6. An image processing apparatus comprising:
a multi-level unit configured to apply a multi-level process on binary halftone dot image data indicating a binary halftone dot image, to form multi-level image data;
an acquiring unit configured to acquire a number of screen lines of the binary halftone dot image data;
a tone correcting unit configured to determine a tone correction amount corresponding to the number of screen lines of the binary halftone dot image data acquired by the acquiring unit, and configured to apply tone correction on the multi-level image data produced by the multi-level unit, by using the determined tone correction amount; and
a re-binarizing unit configured to binarize the multi-level image data in which the tone is corrected by the tone correcting unit, without changing a halftone dot shape of the binary halftone dot image data, to produce re-binarized halftone dot image data,
wherein the acquiring unit is configured to acquire, based on a use of the binary halftone dot image, a number of screen lines corresponding to the use, as the number of screen lines of the binary halftone dot image.

7. An image forming system including:
an image processing apparatus comprising:
- a multi-level unit configured to apply a multi-level process on binary halftone dot image data indicating a binary halftone dot image, to form multi-level image data;
- an acquiring unit configured to acquire a number of screen lines of the binary halftone dot image data;
- a tone correcting unit configured to determine a tone correction amount corresponding to the number of screen lines of the binary halftone dot image data acquired by the acquiring unit, and configured to apply tone correction on the multi-level image data produced by the multi-level unit, by using the determined tone correction amount; and
- a re-binarizing unit configured to binarize the multi-level image data in which the tone is corrected by the tone correcting unit, without changing a halftone dot shape of the binary halftone dot image data, to produce re-binarized halftone dot image data; and an image forming apparatus which forms an image based on the re-binarized halftone dot image data produced by the image processing apparatus.

* * * * *